Figures 1, 2:
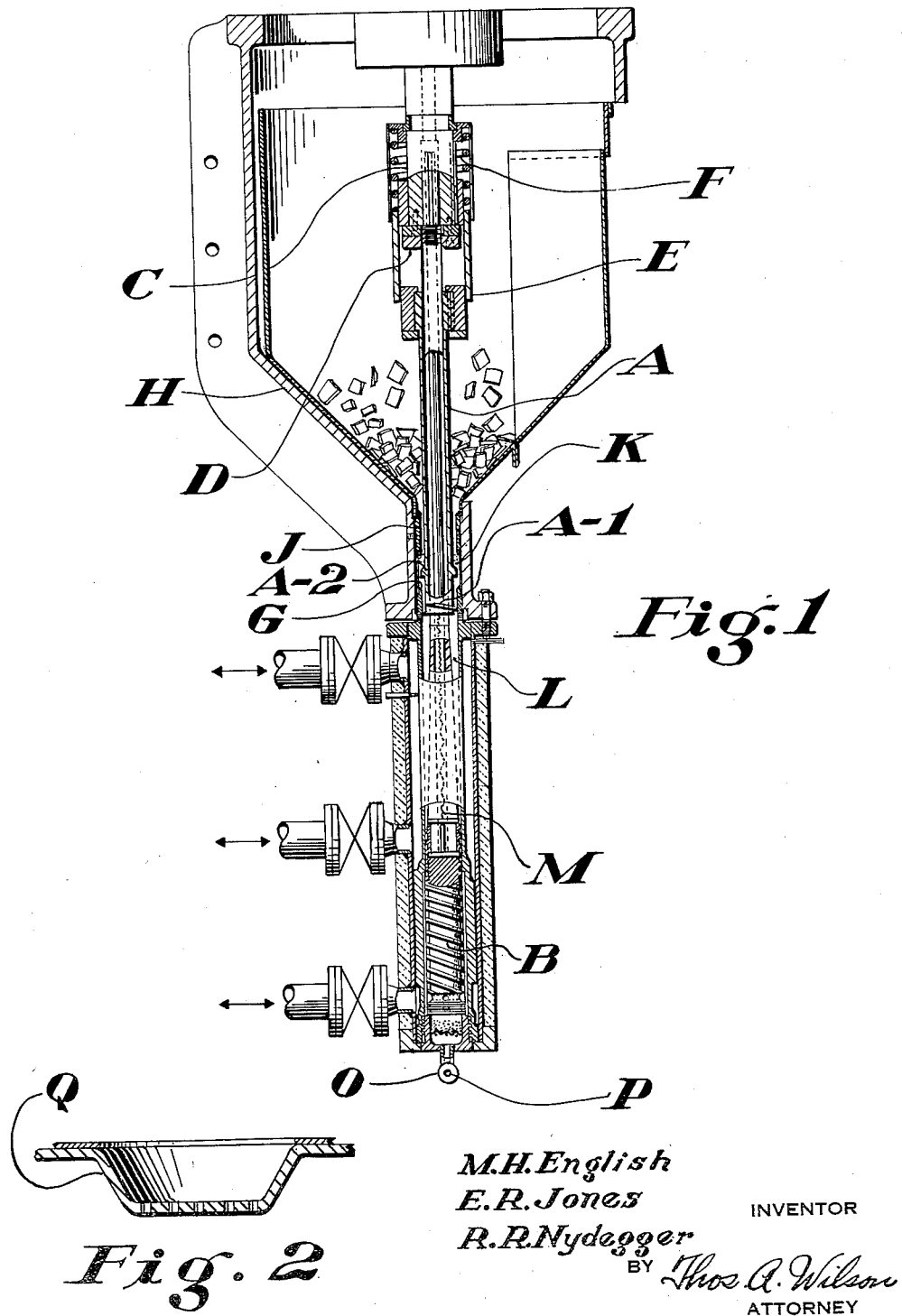

May 23, 1944.  M. H. ENGLISH ET AL  2,349,254

EXTRUSION DEVICE

Filed Oct. 8, 1941

M. H. English
E. R. Jones
R. R. Nydegger
INVENTOR

BY Thos. A. Wilson
ATTORNEY

Patented May 23, 1944

2,349,254

UNITED STATES PATENT OFFICE 2,349,254

EXTRUSION DEVICE

Myrle H. English, Pompton Lakes, N. J., Earl R. Jones, Roxborough, Pa., and Roland R. Nydegger, Wilmington, Del., assignors to E. I. du Pont de Nemours & Company, Wilmington, Del., a corporation of Delaware Application October 8, 1941, Serial No. 414,114

3 Claims. (Cl. 18—12)

This invention relates to the extrusion of organic materials capable of flow at elevated temperatures. In particular, it constitutes an improvement over the device and method covered in the copending application of one of us, Serial No. 367,882, filed November 30, 1940.

The extruding methods and devices of the prior art are characterized by many disadvantages. For instance, none of these prior art means have been satisfactory for the extrusion of organic materials which are fusible compounds or crystalline compounds with sharp melting points.

The object of the present invention is new and improved extrusion means. A further object is new and improved extrusion apparatus. Another object is an extrusion method especially suitable for crystalline organic compounds with sharp melting points. Other objects will be disclosed in the following.

We have found that the foregoing objects are accomplished when the organic material to be extruded is passed downward through a vertically arranged extrusion device including a vertical screw. Preferably, the material is first fed into the device, passed downward through a sharply defined heating zone to be melted therein, and then through a metering zone to an extrusion orifice. Accordingly, the apparatus preferably includes a vertically arranged screw disposed in a vertical chamber. Both the screw and chamber preferably are divided into three distinct zones, the feeding zone, the melting zone, and the metering zone.

As to the vertical screw itself, it is a preferred feature of the invention that the screw be a composite element, the upper or feeding portion being characterized by a metal composition or outer surface having a low heat transfer coefficient. Stainless steel is especially suitable for this purpose. The intermediate or melting portion of the screw disposed immediately below the feeding portion is characterized by a metal composition having a high heat transfer coefficient as compared with that of the feeding portion. Machine steel is especially suitable for constructing this portion of the screw. Immediately below this intermediate melting portion is the metering portion which, like the upper or feeding portion, is characterized by a low heat transfer coefficient. Stainless steel is suitable for this purpose.

The vertical chamber in which the vertical screw is disposed may be considered as comprising the three zones noted. The upper or feeding zone need not be heated. The intermediate or melting zone is surrounded by heating means. Preferably, insulating rings separate the feeding zone from the melting zone so that the material is subject to a sharp temperature change in passing from the feeding zone into the melting zone. It is not necessary to heat the material further after it passes from the melting zone into the metering zone.

Improved feeding and operation in general has been achieved in the present device by means of a slidable relationship between the feed screw and the metering screw. The new structure differs from that described in our copending application already mentioned in that the feeding and metering screws are no longer held in fixed relationship. Instead, the feed screw is slidably mounted on the metering screw. Each is driven independently from the reducer shaft.

The invention will be more readily understood by referring to the accompanying drawing wherein a preferred embodiment is depicted. It is understood that this is for the purpose of illustration only and does not limit the scope of the invention in any way.

Figure I is a vertical elevation in-cross-section of an apparatus according to the present invention. Figure II is a view of a conventional spinnerette.

Referring in detail to Figure I, the feed screw A is slidably mounted on the shank of metering screw B. Each is driven independently from the reducer shaft C. The metering screw B is held in positive keyed relationship with the reducer shaft C, its upward thrust being carried through nut D to the reducer shaft bearings. The feed screw A is splined to the reducer shaft C through coupling E. The splined fit between the coupling E and the reducer shaft C is backed up to spring F which forces the feed screw A in a downward direction to supply pressure for accelerated melting and positive feed of melt to the metering screw B.

The bottom of the feed screw A is equipped with a feed thread A—1 and a throttling collar A—2. In its bottom position the feed thread A—1 engages a grooved feed bushing G. As the flake descends from hopper H, it passes between the shank of feed screw A and the throttling bushing J to fill the annular opening K between the throttling bushing J and the feed bushing G. When the screw is caused to rotate, the feed thread A—1 forces granular material into the melt chamber L. When the melt chamber L becomes full, the continued feeding action forces feed screw A upward against the resistance of spring F. As the feed screw A continues to rise, throttling collar A—2 enters the throttling bushing J, shutting off the gravity flow of flake from hopper H. However, the granular material in the annular opening K continues to be fed by feed thread A—I such that the rise of the feed screw A continues until the annular opening K has been emptied. The melt metered from the melt chamber L gradually reduces the melt level, whereupon the feed screw A descends sufficiently to present an opening between the throttling bushing J and the throttling collar A—2. When this opening is large enough to permit the granular flakes to "rain down" to the feed thread A—I, the screw tends to rise again and cut off the supply of granular material.

When this cycle of the operation has been reached, an equilibrium is established such that the opening between the throttling bushing J and throttling collar A—2 varies from, for instance, 0 to ¼ inch. By adjusting the spring F the dimensional relationships between the throttling bushing J, the feed bushing G, the throttling collar A—2, and the feed thread A—I, any desired constant pressure can be kept on the melt chamber.

The advantage of a slidable mounted feed screw rests in the fact that the relationship between feed of granular material by the feed screw A and the delivery of melt by the metering screw B ceases to be critical. In addition controllable constant pressures can be maintained in the melt chamber L.

Another feature differing from the copending disclosure lies in the interrupted thread A—I of the feed screw A. This thread A—I covering only 270° of the shank of the feed screw A permits rapid filling of an empty melt chamber L by gravity.

The presence of the screw heater M in the shank of the metering screw B is essential to the operation of the unit. It provides the source of heat necessary to keep a soft film of the material being extruded on the shank of the metering screw B.

The molten material passes from the metering screw into the extrusion head O from which it is extruded as a coating on the wire passing through the die P. The construction of the extrusion head may conform to any conventional design. For instance any known insulating head may be employed for wire coating, the wire passing through the head O in conventional fashion, and receiving a coating as it passes through any conventional die therein; while the vertical apparatus is particularly advantageous for coating wire, it is likewise highly effective for the spinning of staple textile fibers. In this case, the spinnerette Q shown in Figure II would be attached at the base of the vertical assembly and the material spun therethrough. Similarly, the apparatus is suitable for the extrusion of bristles and even larger units including rods and the like. It is likewise advantageous for the production of decorative articles, strand coatings, and film casting.

While the method and apparatus are especially desirable for extruding organic materials having sharp melting points and crystalline structure, they may be employed also for plastic materials and the like, which are extrudable in a pliable condition.

The following examples serve to illustrate specific embodiments of the operation of our invention in the extrusion coating of electrical conductors, the extrusion of solid decorative beading, and the spinning of continuous filaments.

Example 1

Polyhexamethylene adipamide in the form of flakes was introduced into the hopper of an apparatus of the type illustrated in Figure I. By means of a vertically arranged screw, approximately ¾" in diameter and rotating at a speed of 19 R. P. M., the material was fed into the melting chamber, which was surrounded by a heating jacket containing oil at a temperature of 294° C., so that the material was brought to molten condition. Under the pressure of the screw, the molten material passed through the metering portion of said screw and into the extrusion head. The temperature in the head was 289° C. The molten polyhexamethylene adipamide was then extruded as a coating, 0.006" thick, on a wire of 0.025" diameter, passing through the extrusion head at a speed of 700 ft. per minute. The cooled wire possessed excellent properties with respect to abrasion resistance, dielectric characteristics, and the like.

Example 2

In another run, similar material was passed through the hopper and screw, and fused in the melting chamber, the screw revolving at a speed of 22.5 R. P. M. The temperature in both heating jacket and extrusion head was 296° C. A coating of 0.008" thickness was applied to wire of the same diameter, the latter passing through the extrusion head at a speed of 900 ft. per minute. The coated wire possessed desirable properties.

Example 3

Polymerized methyl methacrylate was introduced in the form of small lumps into the hopper of an apparatus such as is illustrated in Figure I. The material was propelled downward to the heating chamber by means of the vertically arranged screw. The material became plastic here and was forced under pressure into the metering portion of the screw, and thence into the extrusion head. From here, it was extruded as an insulation coating on wire of 0.025" diameter. The temperature of the plastic polymerized methyl methacrylate was between 204 and 232° C. in the heating zone, and the same in the extrusion head. Coated wire of desirable properties was obtained.

Example 4

Cellulose acetate was likewise caused to pass through the same apparatus and was extruded in the form of solid, decorative beading of approximately 0.07" diameter. The temperature of the cellulose acetate in the heating chamber and in the extrusion head was between 204 and 218° C. Beading of excellent appearance was obtained.

The present invention offers many advantages over the extrusion means of the prior art. Whereas the conventional horizontal screws are defective because they bite only as the thread passes the hopper opening, the vertical screw according to the present invention takes in material continuously. This makes possible uniform feeding of the material and hence does not impose a feed pulse on the metering zone in the apparatus and hence permits an effective metering step in the process. This feature is especially desirable for molten materials, namely organic materials of sharp melting point which assume a liquid rather than a plastic state upon heating. Such materials must have a continuous feeding or they cannot be properly extruded. The well-defined feeding, melting, and metering zones described in the foregoing are highly effective in achieving this continuous feeding which makes possible metering and improved extrusion results. Furthermore, the process is one favored by gravity, a feature not present in the conventional horizontal extrusion arrangements.

It should be emphasized that the various segments of the screw contribute greatly to the preferred embodiment of the invention, the metering section having a capacity for molten or plastic material smaller than that of the feeding portion. This insures pressure upon the material within the heating zone and consequently more rapid heating or melting, because of the more intimate contact with the hot walls of the apparatus. It is also possible, although not essential, to preheat the material during its passage down through the bushing within which the feeding screw works prior to entering the melting zone, by transfer of heat through the walls.

Various materials can be extruded advantageously in accordance with our invention, for example high melting compounds such as polyhexamethylene adipamide, polyhexamethylene sebacamide, the polyhexamethylene amide of acelaic acid, and interpolymers of these with one another and with other polymeric materials; cellulose derivatives such as ethyl cellulose, cellulose acetate, and the like; polyvinyl acetals, including polyvinyl formal, polyvinyl butyral, and others; polyvinyl ketones; polymerized methacrylates; and many other types of compounds.

The slidable relationship between the feed screw and the metering screw constitutes such an improvement over the device of our copending application that varying rates of speed and differing particle sizes have no adverse effect upon the uniform operation of the extrusion device.

It will be understood that many variations in details may be made without departure from the scope of the invention. We intend to be limited only by the following patent claims.

We claim:

1. In an extrusion device, a metering screw, a feed screw slidably mounted on the shank of said metering screw, a reducer shaft in positive keyed relationship with said metering screw, a coupling surrounding said reducer shaft and said feed screw shaft, the said screw shaft being splined to the reducer shaft through said coupling, a spring disposed about said reducer shaft above said coupling to force the feed screw downward to supply pressure for accelerated melting and positive feed of melt to the metering screw.

2. In an extrusion device, a metering screw, a feed screw slidably mounted on the shank of said metering screw, a melting chamber, heating means disposed around said melting chamber, heating means disposed in the shank of said metering screw, a reducer shaft in positive keyed relationship with said metering screw, a coupling surrounding said feed screw shaft, said feed screw shaft being splined to the reducer shaft through said coupling and a spring disposed around said reducer shaft above said coupling to force the feed screw downward to supply pressure for accelerated melting and positive feed of melt to the metering screw.

3. In an extrusion device, a metering screw, a feed screw slidably mounted on the shank of said metering screw, a reducer shaft in positive keyed relationship with said metering screw, a coupling surrounding said reducer shaft and said feed screw shaft, the said feed screw shaft being splined to the reducer shaft through said coupling, means disposed about said reducer shaft to force the feed screw downward to supply pressure for accelerated melting and positive feed of melt to the metering screw.

MYRLE H. ENGLISH.
EARL R. JONES.
ROLAND R. NYDEGGER.